United States Patent [19]

Dexheimer et al.

[11] Patent Number: 4,689,082

[45] Date of Patent: Aug. 25, 1987

[54] POLYMER COMPOSITION

[75] Inventors: Edward M. Dexheimer; Basil Thir, both of Grosse Ile, Mich.

[73] Assignee: BASF Corporation, Parsippany, N.J.

[21] Appl. No.: 792,204

[22] Filed: Oct. 28, 1985

[51] Int. Cl.$^4$ .................. C04B 35/68; C11D 17/00
[52] U.S. Cl. .................. 106/38.22; 252/174.22
[58] Field of Search .................. 252/174.22; 106/38.22

[56] References Cited

U.S. PATENT DOCUMENTS

| | | | |
|---|---|---|---|
| 3,146,272 | 8/1964 | Lloyd | 564/305 |
| 3,429,822 | 2/1969 | Grunewald et al. | 252/174.22 |
| 3,504,081 | 3/1970 | Aron | 106/38.22 |
| 3,549,543 | 12/1970 | Kirstahler et al. | 252/174.22 |
| 4,217,394 | 8/1980 | Newkirk et al. | 106/38.22 |
| 4,246,919 | 1/1981 | McClaflin | 137/13 |
| 4,510,067 | 4/1985 | Ozmeral | 252/174.22 |
| 4,555,549 | 11/1985 | Camp et al. | 525/409 |

*Primary Examiner*—Theodore Morris
*Attorney, Agent, or Firm*—Bernhard R. Swick; Joseph D. Michaels

[57] ABSTRACT

The instant invention relates to a rubber lubricant composition characterized by complete wetting of the elastomer surface both before and after vulcanization which gives a matte finish on cooling down that remains soft and does not flake off and which washes off easily after molding whereby there is little of no ooze after several months storage. This comprises (1) polyoxypropylene-polyoxyethylene block copolymer having a molecular weight of the hydrophobe of about 1000 to 12,000 and containing 40 to 80 percent oxyethylene groups and (2) an alkyl phenol ethoxylate.

6 Claims, No Drawings

POLYMER COMPOSITION

BACKGROUND OF THE INVENTION

This invention relates to a composition of polyoxyalkylene polymers and more particularly to polyoxyalkylene compositions as mold release agents or lubricants in molding processes.

In the molding of natural and synthetic rubber and certain other polymers, generally an efficient mold release agent or lubricant is required to overcome the tendency of the polymer to stick to the mold which is often of metal. Both high temperatures and high molding pressures are often encountered in such molding processes. To facilitate the removal of the molded objects, lubricants of the prior art have generally included mineral waxes, vegetable waxes, fatty acids, and metallic soaps which are applied by spray or other methods of coating to the mold surface.

It is also known to use polyoxyalkylene compounds such as block and heteric copolymers of ethylene oxide and propylene oxide for this purpose. An important application is for use as a lubricant in the production of tires and rubber hose. In the latter case it is used as a lubricant to allow easy removal of radiator-type hose from the mandrels used to form the hose during vulcanization. A preferred material for such application is generally referred to as EPDM.

The term "EPDM" is used in the sense of its definition as found in ASTM-D-1418-64 and is intended to mean a terpolymer of ethylene, propylene and a diene monomer. Illustrative methods for preparing such terpolymers are found in U.S. Pat. No. 3,280,082 and British Patent No. 1,030,289, the disclosures of which are incorporated herein by reference. The preferred terpolymers contain from about 40 to about 80 weight percent ethylene and from about 1 to about 10 weight percent of the diene with the balance of the terpolymer being propylene. This is an elastomer which can be vulcanized; used for automotive parts, cable coating, hose, footwear, and other products.

The copolymers employed in the prior art as mold release agents present problems in that they do not give complete wetting on the EPDM elastomer surface and tend to solidify and flake off after vulcanization, thus giving a non-uniform appearance which is found objectionable by customers for these products. It is desirable for such products to give good wetting *both* before and after vulcanization. Also, the rubber products should have a matte finish, i.e., be free from shine or at least from a high shine and the mold release composition should give complete wetting both at room temperature and 45° C.

U.S. patent application Ser. No. 675,018 now U.S. Pat. No. 4,555,549 discloses an improved mold release agent with excellent properties, particularly with respect to the above problems, that is to say it gives complete wetting both before and after vulcanization and leaves a matte finish. While the copolymers employed in this application are excellent mold release agents, they do present some problems with respect to warm weather storage of the rubber parts in that the mold release agent tends to ooze out of hoses during warm weather storage.

U.S. Pat. No. 3,504,081 discloses lubricants useful as parting agents in molded rubber articles. These comprise a mixture which includes monoalkylphenyl ethers of lower molecular weight polyethylene glycols wherein the alkyl group may be a straight or branched chain group from about 8 to 12 carbon atoms and a polyethylene glycol containing from about 4 to about 6 ethyleneoxy units. A second component is a higher molecular weight ethylene glycol.

U.S. Pat. No. 4,217,394 discloses mold release compositions suitable for lubricating metal molds employing polyoxyalkylene compounds and including mixtures of more than one polyoxyalkylene compound.

SUMMARY OF THE INVENTION

The instant invention relates to a rubber lubricant composition which easily dissolves off rubber parts and does not ooze out during warm weather storage. This comprises (1) polyoxypropylene-polyoxyethylene block copolymer having a molecular weight of the polyoxypropylene hydrophobe of about 1000 to 12,000 and containing 30 to 80 percent oxyethylene groups and (2) an alkyl phenol ethoxylate having an alkyl group of about 2 to 10 carbon atoms and about 7 to 30 oxyethylene groups.

DESCRIPTION OF THE PREFERRED EMBODIMENTS

The polyoxyethylene-polyoxypropylene block copolymer of use in the invention is a cogeneric mixture of conjugated polyoxyethylene-polyoxypropylene compounds corresponding to the following formula:

$$Y[(C_3H_6O)_n(C_2H_4O)_mH]_x \qquad (I)$$

wherein Y is the residue of an organic compound having from about 1 to 6 carbon atoms and containing x reactive hydrogen atoms in which x has a value of at least about 1, n has a value such that the molecular weight of the hydrophobe base is about 1000 to 12,000 and m has a value such that the oxyethylene chains constitute about 30 to 80 weight percent of the compound. Falling within the scope of the definition for Y are, for example, propylene glycol, glycerine, pentaerythritol, trimethylolpropane, ethylene diamine and the like. The oxypropylene chains optionally, but advantageously, contain small amounts of oxyethylene and oxybutylene groups and the oxyethylene chains also optionally, but advantageously, contain small amounts of oxypropylene and oxybutylene groups. These compositions are more particularly described in U.S. Pat. Nos. 2,677,700, 2,674,619 and 2,979,528.

Nonionics to which this invention is particularly applicable are those wherein Y is propylene glycol, and the resulting formula is:

$$HO(C_2H_4O)_m(C_3H_6O)_n(C_2H_4O)_mH \qquad (II)$$

wherein n has a value such that the molecular weight of the hydrophobe is about 2500 to 4000 and m is the same as in formula (I) above.

Other nonionics of particular value are those where Y is the residue of ethylene diamine and the resulting formula is

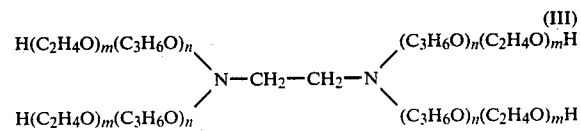

wherein n has a value such that the total molecular weight is about 5000 to 30,000, molecular weight of the hydrophobic base is about 1000 to 12,000 and m is the same as in formula (I) above.

The term "cogeneric mixture," as used herein, designates a series of closely related homologues that are obtained by condensing a plurality of oxide units with an alcohol or a mixture thereof. (See U.S. Pat. No. 2,549,438, particularly column 2, line 40 et seq.) As is known, when a mixture of compounds of this type is generated, various oxyalkylene chain lengths are obtained. Accordingly, throughout this application when oxyalkylene weight percents are referred to, average weight percents are meant.

The second component of the composition of the instant invention is an alkyl phenol ethoxylate having an alkyl group of about 2 to 10 carbon atoms and about 7 to 30 oxyethylene groups. These products may be represented by the following formula:

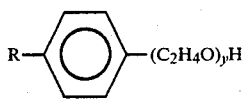
(IV)

wherein R is an alkyl group having from 2 to 10 carbon atoms and y is from about 7 to 30.

The composition of the instant invention contains from about 40 to 99 percent by weight of the compound of formulas I, II, or III above, and about 1 to 60 percent by weight of the compound of formula IV, above. A preferred range is about 60 to 99 percent by weight of the compound of formulas I, II, or III above and about 1.0 to 40 percent of the compound of formula IV above.

The lubricant composition may also include a conventional antioxidant such as the typical hindered phenol antioxidants, the best known of which is 2,6-ditertiary- butyl-p-cresol frequently called BHT (butylated hydroxytoluene). Other examples of this group of antioxidants include butylated styrenated cresol sold by the Goodyear Company under the trademark Wingstay V. Other such phenolic antioxidants include those sold under the trademark Wingstay S, Wingstay T, and Wingstay C (Goodyear Company). Other antioxidants that may be incorporated into the composition include distearyl thiodipropionate, tetrakis[2,4-d-tert-butylphenyl]-4,4'-biphenylylenediphosphonite sold under the name Sandostab P-EPQ (Sandoz Company) and N-cyclohexyl-N'-phenyl-p-phenylenediamine sold under the name Santoflex GP (Monsanto Company). Preferably the amount of antioxidant in the composition is from about 0.1 to 10 percent preferably about 0.1 to 5 percent by weight of the total composition.

In the process of lubricating a metal mold, the polyoxyalkylene compounds of the instant invention are applied as a blend and coated onto the metal mold or mandrel, preferably by spraying or brushing.

While the mold release composition of the invention is particularly suited for use with natural and synthetic rubber, particularly EPDM, other polymer compositions ordinarily subjected to a molding operation can be more conveniently used utilizing the mold release composition of the instant invention. The mold release composition of the invention is effective with synthetic rubbers such as styrene-butadiene rubber, neoprene rubber, nitrile rubber, polysulfide rubber, and cis-1,4-isoprene rubbers. Various molded polymers can also be produced using said mold release compositions such as thermoplastic butadiene elastomers, polyurethane polymers, polyesters, polystyrene, polyamides and polyvinyl chloride.

The amount of the mold release composition employed generally will depend on the particular use and the particular polymer with which the mold release composition or lubricant of the invention is employed. Where the mold release compositions of the invention are partially compatible with the high molecular weight polymer, i.e., the elastomer, amounts ranging from about 1 percent up to about 40 percent by weight of said polymer can be employed. However, if the lubricant or mold release composition of the invention is not compatible with said high molecular weight polymer, amounts ranging from about 0.1 up to about 5 weight percent of said polymer are employed.

The invention will be further illustrated by the following specific examples. Where not otherwise specified throughout the specification and claims, temperatures are in degrees centigrade and parts, percents and proportions are by weight.

EXAMPLE 1

A lubricant composition consisting of 99 percent of a polymer of the type shown in formula (II) above, referred to hereinafter as polymer #1, and 1 percent of a polymer of the type shown in (IY) above, hereinafter referred to as polymer #2, is prepared. Polymer #1 is a polyoxyethylene-polyoxypropylene block copolymer having a molecular weight of the polyoxypropylene hydrophobe of 3250 and containing 50 percent by weight oxyethylene groups. Polymer #2 is one where R in formula IV is a linear alkyl group having 9 carbon atoms and which contains 9 oxyethylene groups. This composition, when employed under actual hose molding conditions, exhibits complete wetting before and after vulcanization. The molded elastomer is characterized by a uniform non-cracking matte appearance. The composition is easily washed off the mold and hose whereby there is no oozing even after storage for several months.

EXAMPLE 2

A lubricant composition is prepared consisting of 80 percent polymer #1, 19.5 percent of polymer #2, and 0.5 percent butylated hydoxytoluene. This composition when employed under actual hose molding conditions exhibits complete wetting before and after vulcanization, and the molded elastomer is characterized by a uniform non-cracking matte appearance. This composition is easily washed off of the molded hose whereby there is no oozing even when the hose is stored for several months.

EXAMPLE 3

A lubricant composition similar to Example 1 is prepared with the exception that in lieu of polymer #2, a polymer referred to herein as polymer #3 is employed which is a polymer of the type shown in formula (IV) having 15 oxyethylene groups and wherein R is an alkyl group having 8 carbon atoms. This composition when employed under actual hose molding conditions exhibits complete wetting before and after vulcanization, and the molded elastomer is characterized by a uniform non-cracking matte appearance. This composition is easily washed off of the molded hose whereby there is no oozing even when the hose is stored for several months.

EXAMPLE 4

A composition similar to Example 3 is prepared with the exception that the composition consists of 70 percent polymer #1, 29.5 percent polymer #3, and 0.5 percent butylated styrenated cresol. This composition when employed under actual hose molding conditions exhibits complete wetting before and after vulcanization, and the molded elastomer is characterized by a uniform non-cracking matte appearance. This composition is easily washed off of the molded hose whereby there is no oozing even when the hose is stored for several months.

EXAMPLE 5

Example 1 is repeated with the exception that in lieu of polymer #1, a polymer designated herein as polymer #4 is employed. Polymer #4 is a polymer of the type shown in formula III above having a total molecular weight of the polyoxypropylene hydrophobe of 10,500 and containing 40 percent by weight oxyethylene groups. This composition when employed under actual hose molding conditions exhibits complete wetting before and after vulcanization, and the molded elastomer is characterized by a uniform non-cracking matte appearance. This composition is easily washed off of the molded hose whereby there is no oozing even when the hose is stored for several months.

The embodiments of the invention in which an exclusive privilege or property is claimed are defined as follows:

1. A composition of matter consisting essentially of: 40 to 99 percent of a polyoxyethylene-polyoxypropylene copolymer of the formula $$Y[(C_3H_6O)_n(C_2H_4O)_mH]_x \qquad (1)$$

wherein Y is the residue of an organic compound having from about 1 to 6 carbon atoms and containing x reactive hydrogen atoms in which x has a value of at least 1, n is an integer; the value of which is such that the molecular weight of the hydrophobe base is from about 1000 to 12,000 and the value of m is such that the oxyethylene groups constitute about 30 to 80 percent by weight of the compound and 1 to 60 percent of an alkyl phenol ethoxylate represented by the formula:

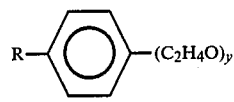

wherein R is an alkyl group having from 2 to 10 carbon atoms, and y is from about 7 to 30.

2. The composition of claim 1 consisting essentially of 40 to 99 percent of said polyoxyethylene-polyoxypropylene copolymer, 1 to 60 percent of said alkyl phenol ethoxylate, and 0.1 to 10 percent antioxident.

3. A composition of matter consisting essentially of: 60 to 99 percent of: a polyoxyethylene-polyoxypropylene copolymer of the formula:

$$HO(C_2H_4O)_m(C_3H_6O)_n(C_2H_4O)_mH$$

wherein n is an integer; the value of which is such that the molecular weight of the oxypropylene groups is from about 2500 to 4000; and the value of m is such that the oxyethylene groups constitute about 30 to 80 percent of the compound and 1.0 to 40 percent of an alkyl phenol ethoxylate represented by the formula

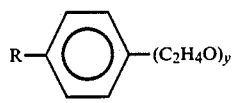

wherein R is an alkyl group having from 2 to 10 carbon atoms, and y is from about 7 to 30.

4. The composition of claim 3 consisting essentially of 60 to 99 percent of said polyoxyethylene-polyoxypropylene copolymer, 1.0 to 40 percent of said alkyl phenol ethoxylate and 0.1 to 5 percent antioxident.

5. A composition of matter consisting essentially of: 60 to 99 percent of: a polyoxyethylene-polyoxypropylene copolymer of the formula:

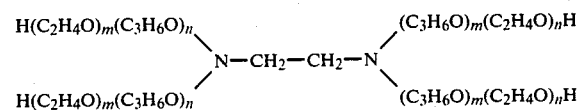

wherein n is an integer; the value of which is such that the molecular weight of the hydrophobic base is from about 1000 to 12,000; and the value of m is such that the oxyethylene groups constitute about 30 to 80 percent by weight of the compound and 1.0 to 40 percent of an alkyl phenol ethoxylate represented by the formula:

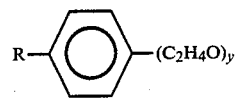

wherein R is an alkyl group having from 2 to 10 carbon atoms and y is from about 7 to 30.

6. The composition of claim 5 consisting essentially of 60 to 99 percent of said polyoxyethylene-polyoxypropylene copolymer, 1.0 to 40 percent of said alkyl phenol ethoxylate and 0.1 to 5 percent antioxident.

* * * * *